US012381983B2

United States Patent
Alves dos Santos et al.

(10) Patent No.: US 12,381,983 B2
(45) Date of Patent: Aug. 5, 2025

(54) SYSTEM AND METHOD FOR MANAGING COMMUNICATIONS IN A NETWORKED CALL CENTER

(71) Applicant: Talkdesk, Inc., San Francisco, CA (US)

(72) Inventors: Ana Priscila Vieira Alves dos Santos, Lisbon (PT); Bin Ren, Hubei (CN); Francisca Gomes Leal Santiago Pinto, Lisbon (PT); Jose Miguel Fernandes Do Seixo Soares Guilherme, Lisbon (PT); Xingchen Zhang, Hubei (CN)

(73) Assignee: Talkdesk, Inc., San Francisco, CA (US)

( * ) Notice: Subject to any disclaimer, the term of this patent is extended or adjusted under 35 U.S.C. 154(b) by 221 days.

(21) Appl. No.: 18/117,905

(22) Filed: Mar. 6, 2023

(65) Prior Publication Data

US 2024/0305716 A1    Sep. 12, 2024

(51) Int. Cl.
 *H04M 3/523* (2006.01)
(52) U.S. Cl.
 CPC ....... *H04M 3/5232* (2013.01); *H04M 3/5238* (2013.01)
(58) Field of Classification Search
 None
 See application file for complete search history.

(56) References Cited

U.S. PATENT DOCUMENTS

| | | |
|---|---|---|
| 5,343,518 A | 8/1994 | Kneipp |
| 5,570,419 A | 10/1996 | Cave et al. |
| 5,862,203 A | 1/1999 | Wulkan et al. |

(Continued)

FOREIGN PATENT DOCUMENTS

| | | |
|---|---|---|
| EP | 1 418 519 A1 | 5/2004 |
| JP | 5986065 B2 | 9/2016 |

(Continued)

OTHER PUBLICATIONS

Aksin et al., "The Modern Call Center: A Multi-Disciplinary Perspective on Operations Management Research", Production and Operations Management, 2007, vol. 16, No. 6, pp. 665-688.

(Continued)

*Primary Examiner* — Nafiz E Hoque
(74) *Attorney, Agent, or Firm* — Potomac Law Group, PLLC; Marc S. Kaufman

(57) ABSTRACT

Disclosed implementations include a sequence of logic in a call center system to facilitate warm transfer operations, including when the warm transfer is to a party that is not part of, or integrated with, the call center. Disclosed implementations utilize a connection module to capture and parse connection information, such as a phone number, in a web page or other display on an agent's terminal. The connection information is replaced with a link that can be recognized by the call center and visually recognized by the agent. This provides the agent with a "click-to-call" function that can be used to achieve connection to a third-party expert or associated web page. The connection module ascertains the agent's status in the call center system, and connection logic is applied, based on the status, to execute an appropriate connection strategy in response to selection of the click-to-call operation by the agent.

8 Claims, 7 Drawing Sheets

(56) References Cited

U.S. PATENT DOCUMENTS

| | | |
|---|---|---|
| 5,897,616 A | 4/1999 | Kanevsky et al. |
| 5,966,691 A | 10/1999 | Kibre et al. |
| 5,970,124 A | 10/1999 | Csaszar et al. |
| 6,100,891 A | 8/2000 | Thorne |
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,263,065 B1 | 7/2001 | Durinovic-Johri et al. |
| 6,345,093 B1 | 2/2002 | Lee et al. |
| 6,373,938 B1 | 4/2002 | Palacios et al. |
| 6,377,944 B1 | 4/2002 | Busey et al. |
| 6,385,584 B1 | 5/2002 | Mcalister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,478,051 B2 | 1/2009 | Nourbakhsh et al. |
| 7,537,154 B2 | 5/2009 | Ramachandran |
| 7,634,422 B1 | 12/2009 | Andre et al. |
| 7,657,263 B1 | 2/2010 | Chahrouri |
| 7,664,641 B1 | 2/2010 | Pettay et al. |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,187 B1 | 6/2011 | Pettay et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,335,704 B2 | 12/2012 | Trefler et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,995,648 B1 | 3/2015 | Gibbs et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hegde et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,317,825 B2 | 4/2016 | Defusco et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,602,665 B1 | 3/2017 | Koster |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,813,559 B1 | 11/2017 | Noble et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,354,677 B2 | 7/2019 | Mohamed et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |
| 10,554,817 B1 | 2/2020 | Sullivan et al. |

(56) References Cited

U.S. PATENT DOCUMENTS

| | | |
|---|---|---|
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,923,127 B2 | 2/2021 | Mckenzie et al. |
| 10,929,796 B1 | 2/2021 | Stepanov |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 11,272,054 B1 * | 3/2022 | Gerrard .................. G10L 15/02 |
| 11,417,343 B2 | 8/2022 | Cohen et al. |
| 11,425,252 B1 | 8/2022 | Martin et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0154072 A1 | 8/2003 | Young et al. |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | Macleod |
| 2005/0033957 A1 | 2/2005 | Enokida |
| 2005/0043986 A1 | 2/2005 | McConnell et al. |
| 2005/0063365 A1 | 3/2005 | Mathew et al. |
| 2005/0065837 A1 | 3/2005 | Kosiba et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0173724 A1 | 8/2006 | Trefler et al. |
| 2006/0188086 A1 | 8/2006 | Busey et al. |
| 2006/0203994 A1 * | 9/2006 | Shaffer .................. H04M 3/51 379/266.01 |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0011153 A1 | 1/2007 | Pillai et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121894 A1 | 5/2007 | Noble |
| 2007/0121902 A1 | 5/2007 | Stoica et al. |
| 2007/0121903 A1 | 5/2007 | Moore et al. |
| 2007/0133760 A1 | 6/2007 | Cotignola et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0211881 A1 | 9/2007 | Parker-Stephen |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0004933 A1 | 1/2008 | Gillespie |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0115213 A1 | 5/2008 | Bhatt et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0055920 A1 * | 2/2009 | Murtagh ............. H04M 7/0012 726/12 |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114645 A1 | 5/2010 | Hamilton et al. |
| 2010/0114646 A1 | 5/2010 | Mcilwain et al. |
| 2010/0165977 A1 | 7/2010 | Mccord |
| 2010/0189249 A1 | 7/2010 | Shah et al. |
| 2010/0189250 A1 | 7/2010 | Williams et al. |
| 2010/0211515 A1 | 8/2010 | Woodings et al. |
| 2010/0235341 A1 | 9/2010 | Bennett |

(56) References Cited

U.S. PATENT DOCUMENTS

| | | |
|---|---|---|
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0194684 A1 | 8/2011 | Ristock et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0060587 A1 | 3/2013 | Bayrak et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vyemenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0302301 A1 | 10/2015 | Petersen |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350442 A1 | 12/2015 | O'Connor |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0162478 A1 | 6/2016 | Blassin et al. |
| 2016/0171422 A1 | 6/2016 | Wicaksono et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |

(56) References Cited

U.S. PATENT DOCUMENTS

| | | |
|---|---|---|
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0295020 A1 | 10/2016 | Shaffer et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0360336 A1 | 12/2016 | Gross et al. |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | McGann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | Mccord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0083898 A1 | 3/2018 | Pham |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0164259 A1 | 6/2018 | Liu et al. |
| 2018/0165062 A1 | 6/2018 | Yoo et al. |
| 2018/0165691 A1 | 6/2018 | Heater et al. |
| 2018/0165692 A1 | 6/2018 | McCoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0248895 A1 | 8/2018 | Watson et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0020757 A1 | 1/2019 | Rao et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0124202 A1 | 4/2019 | Dubey et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0128130 A1 | 4/2020 | Geary |
| 2020/0134492 A1 | 4/2020 | Copeland |
| 2020/0134648 A1 | 4/2020 | Qi et al. |
| 2020/0137097 A1 | 4/2020 | Zimmermann et al. |

(56) References Cited

U.S. PATENT DOCUMENTS

| | | |
|---|---|---|
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0380451 A1 | 12/2020 | Izadi |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0073819 A1 | 3/2021 | Hernandez et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1 | 3/2021 | Rahimi et al. |
| 2021/0090570 A1 | 3/2021 | Aharoni et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136198 A1 | 5/2021 | Leavitt et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2021/0201359 A1 | 7/2021 | Sekar et al. |
| 2021/0295237 A1 | 9/2021 | Taher et al. |
| 2021/0405897 A1 | 12/2021 | Hansalia |
| 2022/0114593 A1 | 4/2022 | Johnson et al. |
| 2022/0114594 A1 | 4/2022 | Nunes et al. |
| 2022/0116415 A1 | 4/2022 | Burgis et al. |
| 2022/0122182 A1 | 4/2022 | Marshall et al. |
| 2022/0129905 A1 | 4/2022 | Sethumadhavan et al. |
| 2022/0398682 A1 | 12/2022 | Tam et al. |
| 2023/0007123 A1 | 1/2023 | Krucek et al. |
| 2023/0107335 A1 | 4/2023 | Garyani et al. |

FOREIGN PATENT DOCUMENTS

| | | | |
|---|---|---|---|
| SU | 1732352 A1 | 5/1992 | |
| WO | 2006/037836 A1 | 4/2006 | |
| WO | 2012/024316 A2 | 2/2012 | |
| WO | 2015/099587 A1 | 7/2015 | |
| WO | 2019142743 A1 | 7/2019 | |

OTHER PUBLICATIONS

Aldor-Noiman, et al., "Workload forecasting for a call center: Methodology and a case study." The Annals of Applied Statistics 3.4 (2009); 1403-1447.

Buesing et al., "Getting the Best Customer Service from your IVR: Fresh eyes on an old problem," [online] Mckinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Krishnan, Krish, "Data Warehousing in the Age of Big Data", Morgan Kaufmann, Chapter 5, 2013, 28 pages.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al., "Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.

Federal Register, vol. 75, No. 169, Sep. 1, 2010, pp. 53643-53660.

Federal register, vol. 79, No. 241 issued on Dec. 16, 2014, p. 74629, col. 2, *Gottschalk v. Benson*.

Federal Register, vol. 84, No. 4, Jan. 7, 2019, pp. 50-57.

Federal Register, vol. 84, No. 4, Jan. 7, 2019, p. 53-55.

Grefen et al., "A reference architecture for workflow management systems", Data & Knowledge Engineering, 1998, vol. 27, No. 1, pp. 31-57.

https://www.uspto.gov/patent/laws-and-regulations/examination-policy/examination- guidelines-training-materials-view-ksr, signed 20Aug2010.

Huang et al., "Agent-based workflow management in collaborative product development on the Internet", Computer-Aided Design, 2000, vol. 32, No. 2, pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Koole, et al., "An overview of routing and staffing algorithms in multi-skill customer contact centers." 2006.

Myers et al., "At the Boundary of Workflow and AI", Proc. AAAI 1999 Workshop on Agent-Based Systems in The Business Context, 1999, 09 pages.

Niven, "Can music with prosocial lyrics heal the working world? A field intervention in a call center." Journal of Applied Social Psychology, 2015; 45(3), 132-138. doi:10.1111/jasp.12282 ).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

U.S. Appl. No. 16/668,214, NFOA mailed Nov. 10, 2021.

U.S. Appl. No. 16/668,215, NFOA mailed Dec. 7, 2021.

Van Den Bergh et al. "Personnel scheduling: A literature review", European journal of operational research, 2013, vol. 226, No. 3 pp. 367-385.

United States Patent and Trademark Office, Non-Final Office Action for U.S. Appl. No. 16/550,961 mailed Mar. 2, 2020.

United States Patent and Trademark Office, Final Office Action for U.S. Appl. No. 16/550,961 mailed Jun. 17, 2020.

An, J., Kwak, H. and Jansen, B.J., ip.com, Nov. 2016. "Validating social media data for automatic persona generation", English Abstract, In 2016 IEEE/ACS 13th International Conference of Computer Systems and Applications (AICCSA), 2 pages.

European Search Report in corresponding European Application No. 22178124 dated Oct. 20, 2022.

Galetto, Molly., "What is Customer DNA?", —NGDATA Product News, Oct. 27, 2015, 10 pages.

(56) References Cited

OTHER PUBLICATIONS

Fan et al., "Demystifying Big Data Analytics for Business Intelligence Through the Lens of Marketing Mix", Big Data Research, vol. 2, Issue 1, Mar. 1, 2015, 16 pages.

An et al,, Towards Automatic Persona Generation Using Social Media Aug. 1, 2016, 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

Dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities" Proceedings of the 2003 Winter Simulation Conference, vol. 1, Jan. 1, 2003, pp. 135-143.

Mandelbaum et al., "Staffing Many-Server Queues with Impatient Customers: Constraint Satisfaction in Call Center", Operations Research, Sep.-Oct., 2009, vol. 57, No. 5 (Sep. 1-Oct., 2009), pp. 1189-1205.

Fukunaga et al., "Staff Scheduling for Inbound Call Centers and Customer Contact Centers", AI Magazine, Winter, vol. 23, No. 4, Jan. 1, 2002, pp. 30-40.

Feldman et al., "Staffing of Time-Varying Queues to Achieve Time-Stable Performance", Management Science, Feb. 1, 2008, vol. 54, No. 2, Call Center Management, pp. 324-338.

Business Wire, "Rockwell SSD announces Call Center Simulator", Feb. 4, 1997, 4 pages.

Stearns, "Using skills-based routing to the advantage of your contact center", Customer Inter@ction Solutions, Technology Marketing Corporation, May 1, 2001, vol. 19 No. 11, pp. 54-56.

* cited by examiner

Telephone book

| Contact name | Phone number | Country |
|---|---|---|
| Tom | 1 607-600-8373 | US |
| Jerry | 1 351 308 811 569 | PT |

FIG. 6a

Telephone book

| Contact name | Phone number | Country |
|---|---|---|
| Tom | +1 607-600-8373 | US |
| Jerry | +351 308 811 569 | PT |

FIG. 6b

Open Talkdesk_QA.app?

chrome-extension://jadigicosmphcctcjpepkomgpomegapplg wants to open this application ☐ Always allow chrome-extension://jadigicosmphcctcjpepkomgpomegapplg to open links of this type in the associated app

[ Cancel ]  [ Open Talkdesk_QA.app ]

Telephone book

| Contact name | Phone number | Country |
|---|---|---|
| Tom | +1 607-600-8373 | US |
| Jerry | +351 308 811 569 | PT |

FIG. 6c

SYSTEM AND METHOD FOR MANAGING COMMUNICATIONS IN A NETWORKED CALL CENTER

BACKGROUND

Cloud-based networked contact centers, also referred to as "call centers", are well-known. In such call centers, service agents (referred to as "agents" herein) are assigned to queues based on skills and customer requirements. In a cloud-based contact center, all parties (including customers and agents) can be linked by the cloud-based contact center. FIG. 1 is an example system architecture of cloud-based call center environment. Customers 110 interact with contact center 150 to communicate with the agents 120, through a network 130, via at least one or more of text, email, voice or multimedia channels. Communication routing system 140 controls the routing and handling of communications between customers 110 and agents 120 for the contact center 150. Contact center 150 could be any of a contact center as a service (CCaaS) system, an automated call distributor (ACD) system, or a case system, for example.

Agents 120 may be remote from contact center 150 and handle communications (also referred to as "interactions" or "calls" herein) with customers 110 on behalf of an enterprise. Agents 120 may utilize devices, such as but not limited to, workstations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network (LAN). The network types are provided by way of example and are not intended to limit types of networks used for communications.

Agents 120 may be assigned to one or more queues representing call categories and/or agent skill levels. The agents 120 assigned to a queue may handle communications that are placed in the queue by the communication routing system 140. For example, there may be queues associated with a language (e.g., English or Chinese), topic (e.g., technical support or billing), or a particular country of origin. When a communication is received by the communication routing system 140, the communication may be placed in a relevant queue, and one of agents 120 associated with the relevant queue may assigned to the communication.

Agents may be assigned to one or more entities using the cloud-based contact center. Therefore, it is possible that agents, on any given day or shift, are providing support/service for customers of various entities. For example, an agent may handle a communication from a customer of a computer supplier and then immediately thereafter handle a communication from a customer of an automobile company. Accordingly, agents might not be trained in all aspects of customer service for each entity. The term "customer", as used herein, refers to the party contacting the call center for support or other information and includes actual customers, potential customers, or any other party contacting the call center. Further, agents may be employees of the call center provider, employees of the entity using the call center service, contractors, or freelancers.

In some instances, an agent is not able to address the question/issue raised by a customer and must either transfer the customer to another party or consult with another party. It is known to use a "warm transfer", which allows agents to make consultation calls with service personnel of other departments or parties without ending the conversation with the customer. This allows the agent to receive help from an expert while maintaining the ability maintaining the communication with the customer.

However, a consultation communication originated by warm transfer has a life cycle that can be entirely within a live conversation with the customer. As a result, the speed of initializing and completing the warm transfer will greatly affect the customer's experience. For example, when the warm transfer is accomplished to connect to a consultant that is not part of the call center system (an outside vendor or expert for example), the agent must identify and enter connection information (such as a phone number, telephony link, or web link) for the consultant, execute the connection information (e.g. enter a phone number or web address), and wait for connection to the consultant. This prevents the warm transfer from being affected quickly and smoothly and thus may lower quality of the customer experience.

BRIEF SUMMARY

Disclosed implementations include a sequence of logic in a call center system to facilitate warm transfer operations, including when the warm transfer is to a party that is not part of, or integrated with, the call center. Disclosed implementations utilize a connection module, including a browser plug-in or other monitoring software, to capture and parse connection information, such as a phone number, in a web page or other display on an agent's terminal. The connection information is replaced with a link that can be recognized by the call center and visually recognized by the agent. This provides the agent with a "click-to-call" function that can be used to achieve connection to a third-party expert or associated web page (collectively referred to as "consultant" herein). The connection module ascertains the agent's status in the call center system, and connection logic is applied, based on the status, to execute an appropriate connection strategy in response to selection of the click-to-call operation by the agent. As an example, if the agent is in a live conversation, the call center will transfer the "click-to-call" action to "click-to-consult, and instead of starting a new conversation to the target number, the call center will initiate a consultation (warm transfer) to the number.

One disclosed implementation is a method for initiating communications within an automated call center, the method comprising: parsing, by a browser plug-in installed in a web browser of a call center agent, text of a web page of a third-party consultant to obtain parsed text; applying at least one of an expression format to the parsed text to identity at least one set of connection data in the parsed text; identifying segments of the at least one phone number; inserting the segments into a data structure in accordance with a URL schema compatible with a communication routing module of the automated call center; converting the data structure into a link that is displayed on a user interface of an agent computing device; in response to selection of the link by the agent through the user interface, transmitting a communication request to the routing module; querying a call status of the agent; calling, by the routing module, an application of the automated call center that is specified by the routing request; and initiating a communication with the third-party consultant in accordance with at least one rule which includes the status of the agent as a rule parameter.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 6a shows a phone number user interface in accordance with disclosed implementations.

FIG. 6b shows a phone number user interface with generated links in accordance with disclosed implementations.

FIG. 6c shows a phone number user interface in accordance with disclosed implementations.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Figure 2:
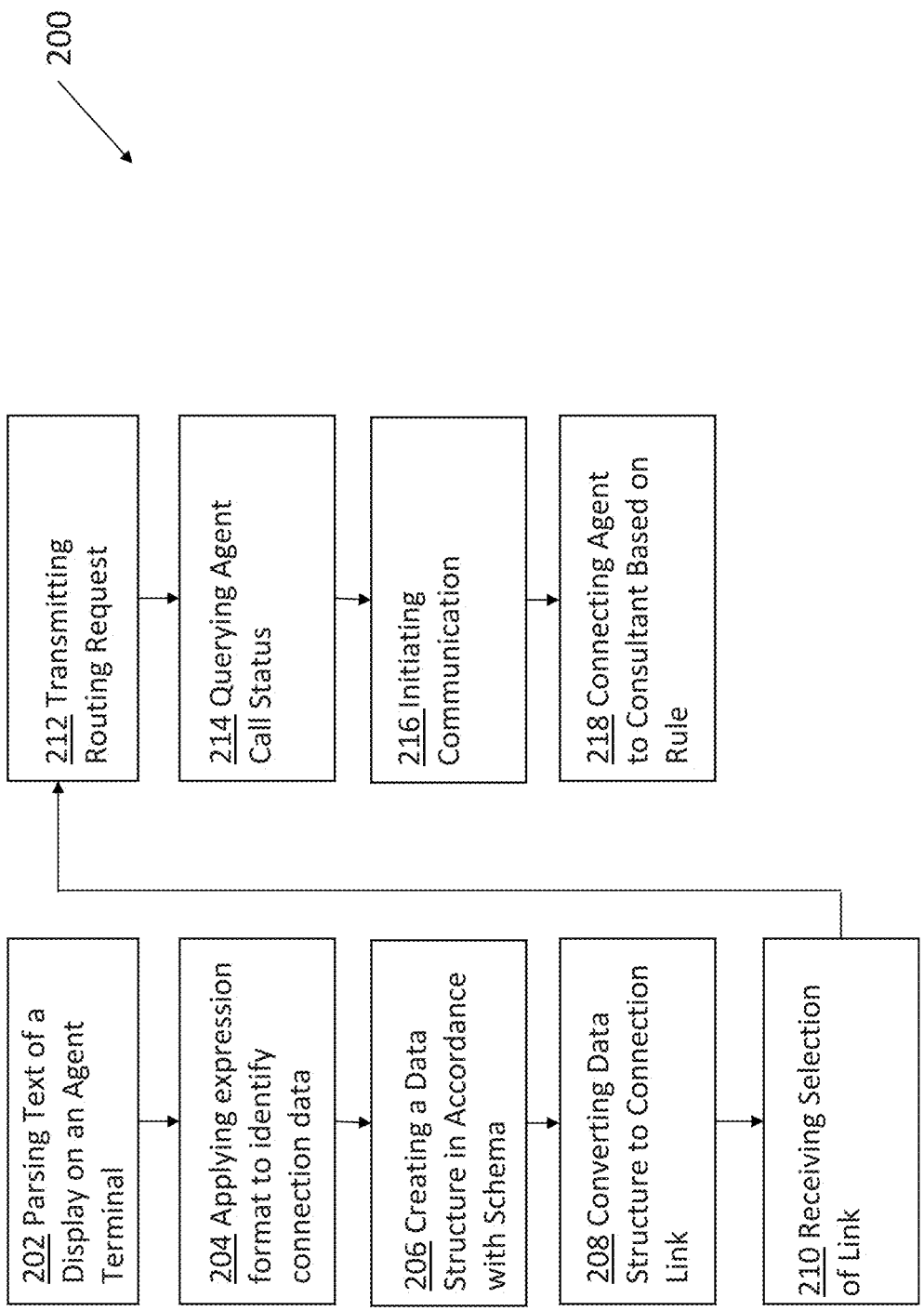
FIG. 2 is a flow chart of a method for initiating a communication in accordance with disclosed implementations.

FIG. 2 illustrates process 200 for initiating consulting communications in accordance with disclosed implementations. As shown in FIG. 2, process 200 begins at 202 by parsing text of a display on an agent terminal. In one example the display can be retrieved as a result of a web search or other query for a consulting party. A plug-in, such as a browser plug-in, can capture visible text being displayed on the display device of the agent terminal. This can be accomplished using a JavaScript Document Object Model (DOM) Application Programming Interface (API) for example. The parsing step can also include converting any image data on the display into text through Optical Character Recognition (OCR).

At step 204, connection information on the display, such as a phone number, is identified by matching the text and one or more regular expression formats that are applied. For example, the expression format [###-###-####] can be applied to identify phone numbers. Further additional rules can be applied to identify the connection information. For example, if an identified phone number is near the word "office" this can be identified as valid connection information as opposed to a fax number or other number that may fit the format of a phone number. The plug-in can identify the segments and components (the country code, area code, body, etc.) of the number and extension from phone numbers by applying the standard E.164 format for example.

At step 206, a connection data structure is created in accordance with a predefined schema that is recognized by the call center. For example, the plug-in can automatically insert an identified phone number into tel-link protocol URL schemas that are recognized by the call center (e.g., [CC prefix]+tel://(800)373-3411). Tel-link protocols are used for setting up click-to-call options online. By using a tel-link protocol, a phone number call link is created on a website, usually in a form of a text link, button or image. Accordingly, the link associated with the connection information can be displayed on the display device of the agent's terminal as a text link, button, image, or other UI element.

At step 210, the agent actuates the UI element, e.g., the agent could click the phone number link to initiate a new call to the consultant. The plug-on can intercept the browser's default click-to-call request and forward it to a call center application to ensure that the communication is established through a desired application of the call center. In response to the actuation of the UI element, a communication request is transmitted to a routing system (such as routing systems 140 of FIG. 1) at step 212. It is possible to configure which call center application is requested through the plug-in. Therefore, if the call center application has different applications for initiating calls (e.g, a desktop application, a web application, different versions etc.), the appropriate application is used to initiate a call.

In response to the click-to-call request reaches, the call center application receives the URL schema and identifies each segment within the URL schema. At step 214, the status of the agent initiating the communication is determined, through a query of an agent parameter in a databased for example, and the agent is connected to the desired consulting party in accordance with a rule applied based on the agent status, at step 218.

Figure 3:
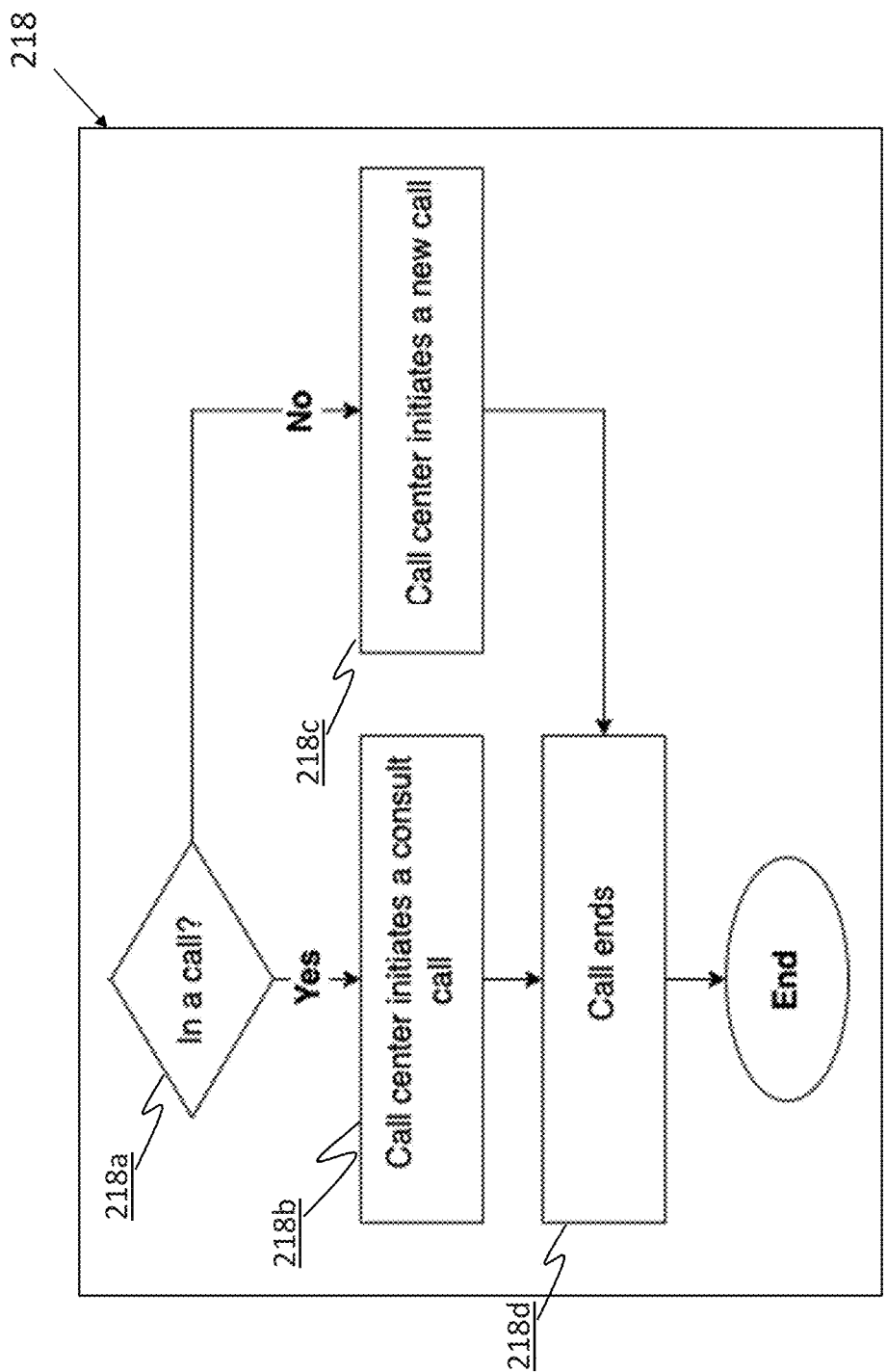
FIG. 3 is a flow chart of call initiation logic in accordance with disclosed implementations.

FIG. 3 illustrates and example of logic that can be applied in step 218. For example, if, at step 218a, it is determined that the agent is already in a live conversation (synchronous communication) with a customer, instead of initiating a new distinct call the call center application could start a warm transfer to the number which has been requested by the click-to-call operation, as step 218b. At this time, the call center will build a consultation call connection to the target number, and once the connection is created, the original conversation with the customer will be put on hold. This ensures a quick consultation that can be built instead of locating a number and back to the call center application to go through the consultation process via its UI. On the other hand, if the agent is determined to be in an idle status (or otherwise not on a synchronous call), the call center can, at step 218c, follow a normal click-to-call logic to start a standard outbound call to the target number. This guarantees that the click-to-call function could also work in cases where the customer is not still in synchronous communication with the agent. At 218d, the agent can terminate the call in a conventional manner.

Figure 1:
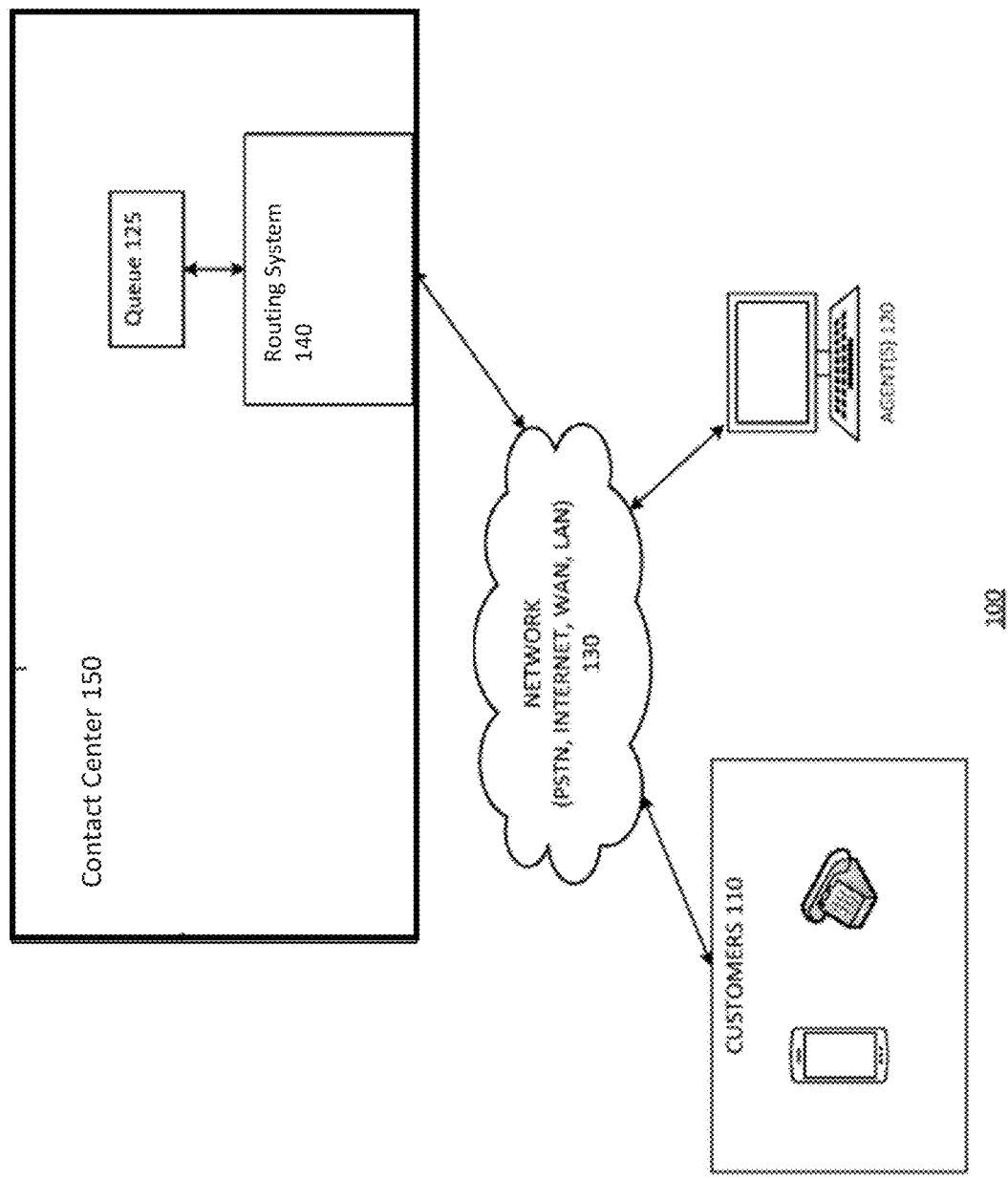
FIG. 1 is a block diagram of a computer architecture of a conventional call center environment.
Figure 4:
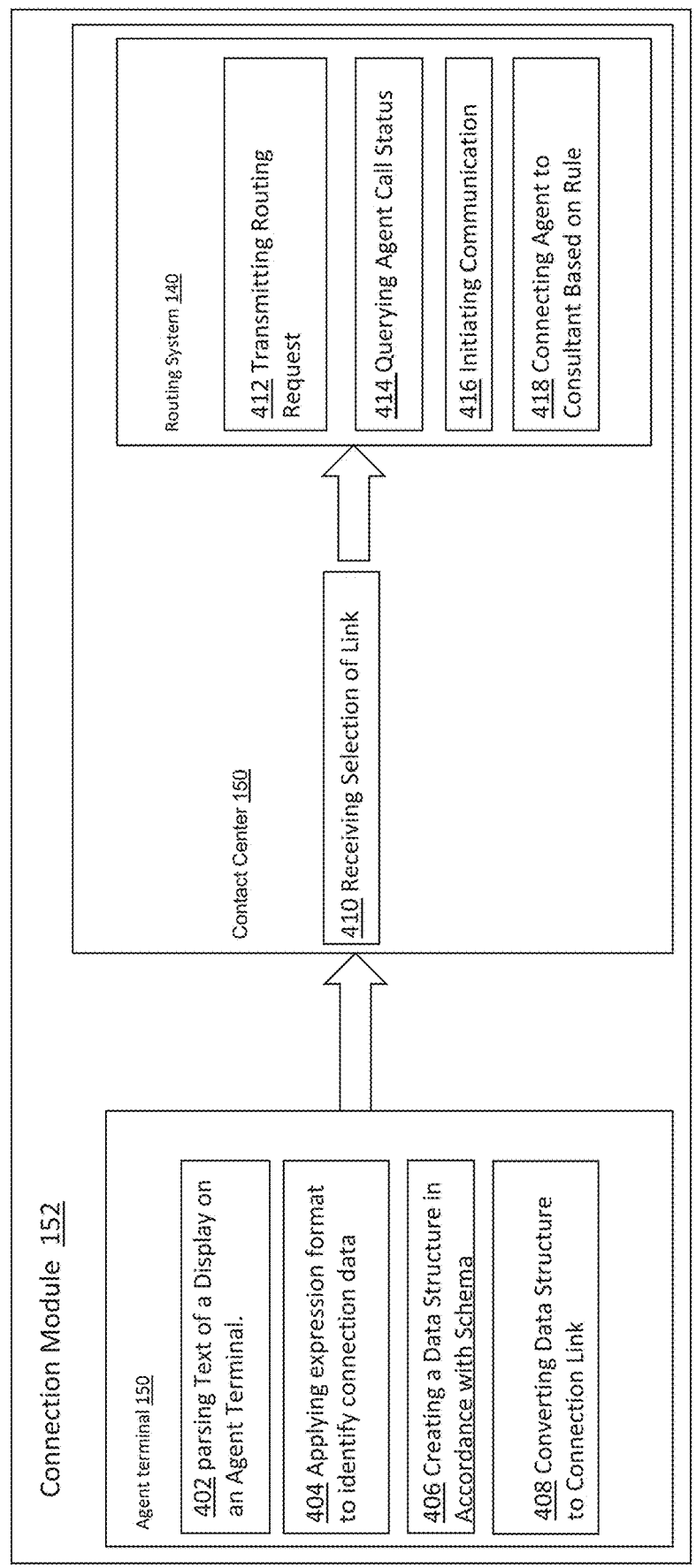
FIG. 4 is a block diagram of a computer contact center connection module in accordance with disclosed implementations.

FIG. 4 illustrates a connection module 152 that can be implemented, for example, in contact center 150 of FIG. 1, in accordance with disclosed embodiments. Connection module 152 includes non-transient memory and at least one computer processor 460. Various other "modules" that make up connection module 152 are defined by code stored in the memory and can be executed by processor(s). The interaction of these modules will become apparent based on the description below.

Code modules 402, 404, 406, and 408 can be executed, as a plug-in for example, in agent terminal 150. Code 402 parses text of a display on an agent terminal. In one example the display can be retrieved as a result of a web search or other query for a consulting party. A plug-in, such as a browser plug-in, can capture visible text being displayed on the display device of the agent terminal. This can be accomplished using a JavaScript Document Object Model (DOM) Application Programming Interface (API) for example. The parsing step can also include converting any image data on the display into text through Optical Character Recognition (OCR).

Code 404, identifies connection information on the display, such as a phone number, by matching the text and one or more regular expression formats that are applied. For example, the expression format [###-###-####] can be applied to identify phone numbers. Further additional rules can be applied to identify the connection information. For example, if an identified phone number is near the word "office" this can be identified as valid connection information as opposed to a fax number or other number that may fit the format of a phone number. The plug-in can identify the segments and components from phone numbers, following the standard E.164 format, for example, the country code, area code, body of the number and extension.

Code 406, creates a connection data structure in accordance with a predefined schema that is recognized by the call center. Code 408 can, for example, automatically insert the identified phone number into tel-link protocol URL schemas that are recognized by the call center (e.g., [CC prefix]+ tel://(800)373-3411). To create a link. Tel-link protocols are used for setting up calling click-to-call options online. By using a tel-link protocol a phone number call link is created on a website, usually in a form of a text link, button or image. Accordingly, the link associated with the connection information can be displayed on the display device of the agent terminal as a text link, button, image, or other UI element.

Code modules 410, 412, 414, 416, and 418 can be executed in contact center 150 (with code 412, 414, 416 and 418 being executed as part of routing system 140). Code 410 receives an actuation of the UI element from the agent, e.g., the agent could click the phone number links to initiate either a new call to the consultant. The plug-in can intercept the browser's default click-to-call request and forward it to a call center application to ensure that the communication is established through a desired application of the call center. In response to the actuation of the UI element, a communication request is transmitted to a routing system (such as routing systems 140 of FIG. 1) by code 412. It is possible to configure which call center application is requested through the plug-in. Therefore, if the call center application has different applications for initiating calls (e.g, a desktop application, a web application, different versions etc.), the appropriate application is used to initiate a call.

The call center application receives the URL schema and identifies each segment within the URL schema. Code 414 determines the status of the agent initiating the communication, through a query of an agent parameter in a databased for example, and the agent is connected to the desired consulting party in accordance with a rule applied based on the agent status by code 418.

The computing devices implementing disclosed implementations can include a variety of tangible computer readable media. Computer readable media can be any available tangible media that can be accessed by device and includes both volatile and non-volatile media, removable and non-removable media. Tangible, non-transient computer storage media include volatile and non-volatile, and removable and non-removable media implemented in any method or technology for storage of information such as computer readable instructions, data structures, program modules or other data.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Figure 5A:
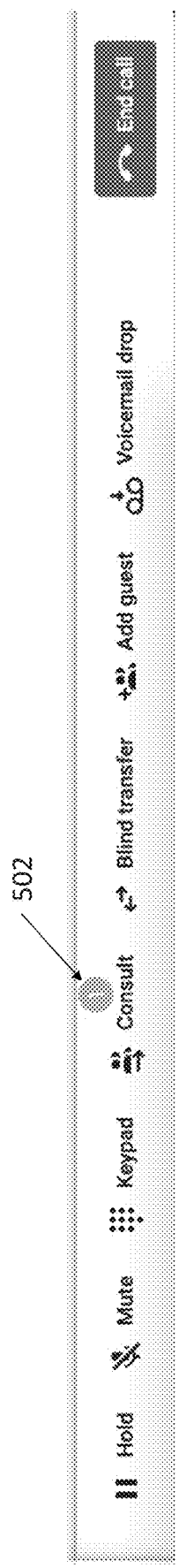
FIG. 5a illustrates a user interface in accordance with disclosed implementations.
Figure 5B:
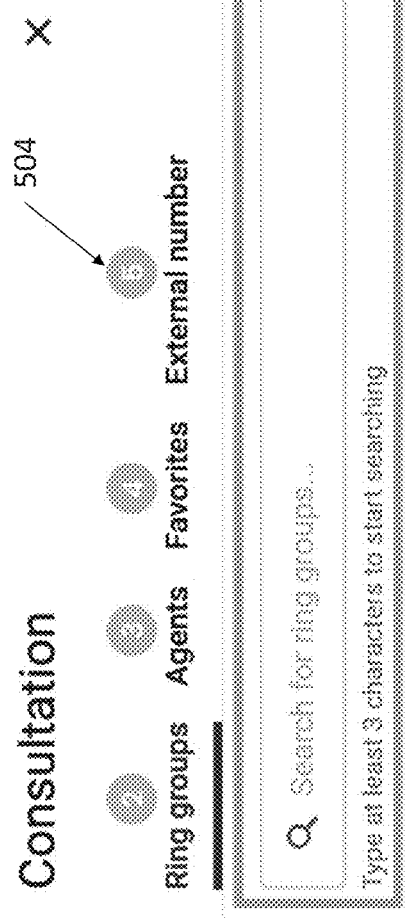
FIG. 5b illustrates a user interface in accordance with disclosed implementations.

Disclosed implementations can be invoked by an agent by selecting a consult UI element, such as UI element 502 if the user interface shown in FIG. 5a. The agent can then select, for example, external number UI element 504 of the user interface shown in FIG. 5b. Selecting UI element 504 can cause the method of FIG. 2 to be accomplished. Following the consultation, the agent can decide to:

Go back to the original call permanently, by ending the consultation;

Transfer the original call to the consulting party; or

Add the contact person to the consultation communication.

FIGS. 6a, 6b, and 6c illustrate a user interface of the plugin code on an agent's browser. FIG. 6a shows the original status a portion of the browser window on the agent's display screen. Text can be, for example, either in pure text format or in the default telephone link format (which will not link to the call center that the agent is currently using). FIG. 6b shows the same portion of the browser window after running the plugin. As noted above, the plugin can parse phone numbers, create links and transfer the links in a manner/format recognized by the call center. FIG. 6c shows the browser display after clicking on any one of the links generated for the phone numbers, wherein the browser will switch to the call center application and provide appropriate actions, such as call connections, in the call center.

Figure 7:
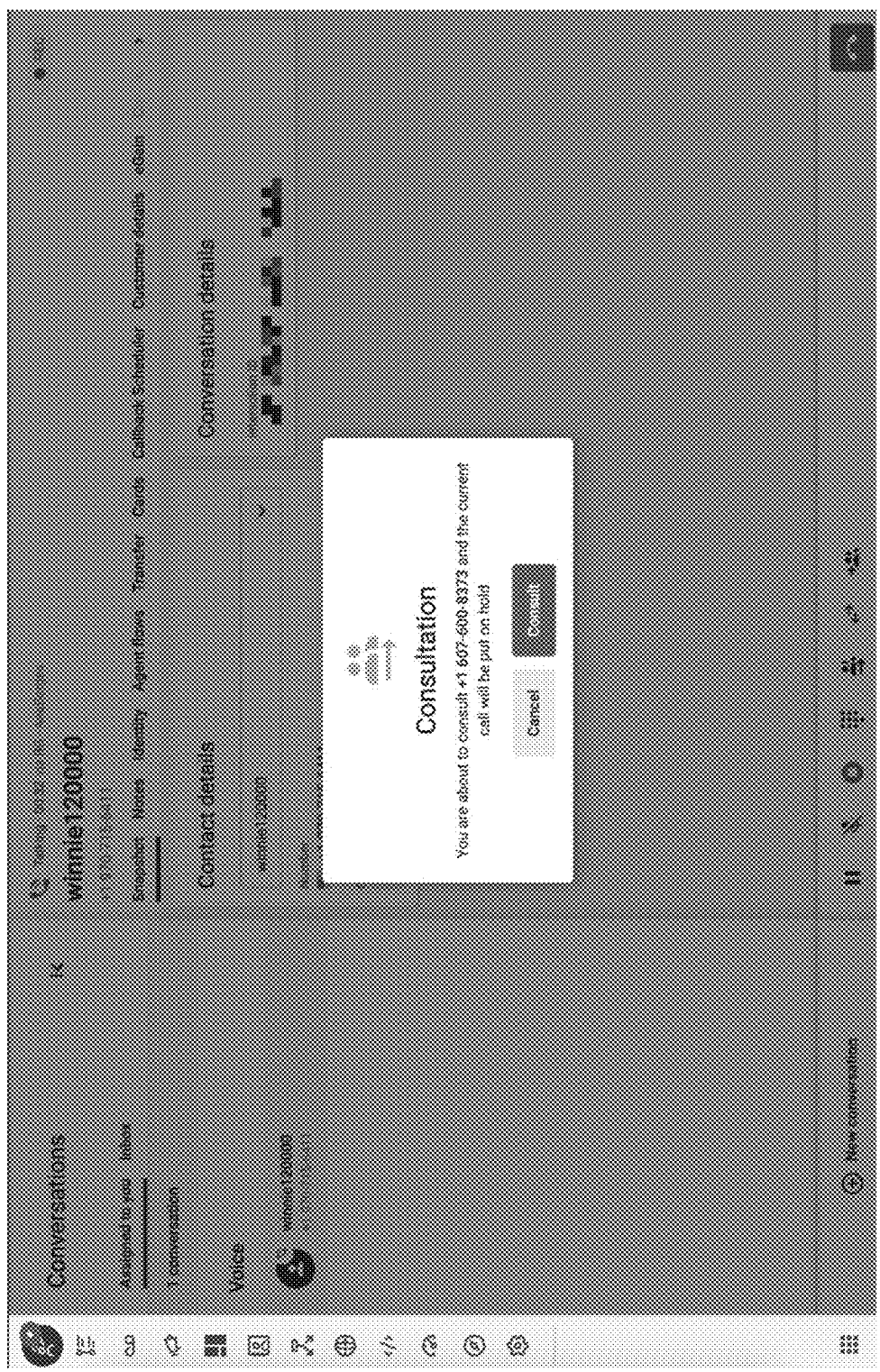
FIG. 7 shows a consultation transfer user interface in accordance with disclosed implementations.

FIG. 7 shows a screenshot of how the Call Center will start a consultation call if the agent is in a busy status, after clicking the link transferred by the plugin. The shadowed part is a normal screen during the call, and instead of letting the agent click the buttons and go through the steps in FIG. 5, the call center application directly shows the pop-up, so that the agent can start the consultation immediately with a user interface selection.

The contact center 150 of FIG. 1 can be in a single location or may be cloud-based and distributed over a plurality of locations, i.e., a distributed computing system.

The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The disclosed implementations apply logic, based on an identification of the agent's status to increase the flexibility and speed when a consulting call is required. The time required for an agent to make a consultation call to a number which is not saved in the call center application is reduced and thus the experience of the customer who is on the call with the agent is improved.

It will be appreciated by those skilled in the art that changes could be made to the disclosed implementations without departing from the broad inventive concept thereof. It is understood, therefore, that this invention is not limited to the disclosed implementations, but it is intended to cover modifications within the spirit and scope of the present invention as defined by the appended claims.

What is claimed:

1. A method of initiating communications within an automated call center, the method comprising:
   parsing, by a browser plug-in installed in a web browser of a call center agent, text of a web page of a third-party consultant to obtain parsed text;
   applying at least one of an expression format to the parsed text to identity at least one set of connection data in the parsed text;
   identifying segments of the at least one set of connection data;
   inserting the segments into a data structure in accordance with a URL schema compatible with a communication routing module of the automated call center;
   converting the data structure into a link that is displayed on a user interface of an agent computing device;
   in response to selection of the link by the agent through the user interface,
   transmitting a communication request to the routing module;
   querying a call status of the agent;
   calling, by the routing module, an application of the automated call center that is specified by the routing request; and
   initiating a communication with the third-party consultant in accordance with at least one rule which includes the status of the agent as a rule parameter.

2. The method of claim 1, wherein the initiating comprises:
   establishing an outbound communication between the agent and the third-party consultant when status of the agent is idle.

3. The method of claim 1, where the connection data includes a phone number.

4. The method of claim 1, wherein the initiating comprises establishing an outbound communication between the agent and the third-party consultant and placing a current communication being handled by the agent on hold when the status of the agent is active.

5. A contact center system for initiating communications within an automated call center, the system comprising:
   an agent computing device having a browser plugin executing thereon, the browser plugin, when executed by a processor of the agent device, being operative to:
      parse, text of a web page of a third-party consultant displayed in the agent computing device to obtain parsed text;
      apply at least one of an expression format to the parsed text to identity at least one set of connection data in the parsed text;
      identify segments of the at least one set of connection data;
      insert the segments into a data structure in accordance with a URL schema compatible with a communication routing module of an automated call center;
      convert the data structure into a link that is displayed on a user interface of an agent computing device; and
      in response to selection of the link by the agent through the user interface, transmitting a communication request to the routing module;
   a call center server having a routing module executing thereon which, when executed by a processor of the call center server, being operative to:
      in response to receiving the communication request, querying a call status of the agent;
      calling, by the routing module, an application of the automated call center that is specified by the routing request; and
      initiating a communication with the third-party consultant in accordance with at least one rule which includes the status of the agent as a rule parameter.

6. The system of claim 5, wherein the initiating comprises:
   establishing an outbound communication between the agent and the third-party consultant when status of the agent is idle.

7. The system of claim 5, where the connection data includes a phone number.

8. The system of claim 5, wherein the initiating comprises establishing an outbound communication between the agent and the third-party consultant and placing a current communication being handled by the agent on hold when the status of the agent is active.

* * * * *